(12) United States Patent
Kimura

(10) Patent No.: US 8,345,292 B2
(45) Date of Patent: Jan. 1, 2013

(54) INFORMATION PROCESSING APPARATUS, INFORMATION PROCESSING APPARATUS CONTROL METHOD, AND STORAGE MEDIUM

(75) Inventor: Hiromi Kimura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 204 days.

(21) Appl. No.: 12/969,061

(22) Filed: Dec. 15, 2010

(65) Prior Publication Data
US 2011/0157637 A1 Jun. 30, 2011

(30) Foreign Application Priority Data
Dec. 28, 2009 (JP) .................................. 2009-296695

(51) Int. Cl.
*G06F 15/00* (2006.01)
*G06K 1/00* (2006.01)

(52) U.S. Cl. .......................... 358/1.15; 358/1.1; 358/1.9
(58) Field of Classification Search ....................... None
See application file for complete search history.

(56) References Cited

FOREIGN PATENT DOCUMENTS
JP 2007-226465 A 9/2007

*Primary Examiner* — Thierry Pham
(74) *Attorney, Agent, or Firm* — Canon USA, Inc., IP Division

(57) ABSTRACT

An information processing apparatus selects attribute information in a predetermined layer based on a result of measurement of the number of appearances of attribute information included in print data, determines a priority order of the attribute information based on the number of times of references to a reusable object from a page corresponding to a record that includes the selected attribute information, serially selects attribute information based on the determined priority order, generates intermediate data for a page corresponding to the selected attribute information, and generates image data by rasterizing the generated intermediate data.

10 Claims, 15 Drawing Sheets

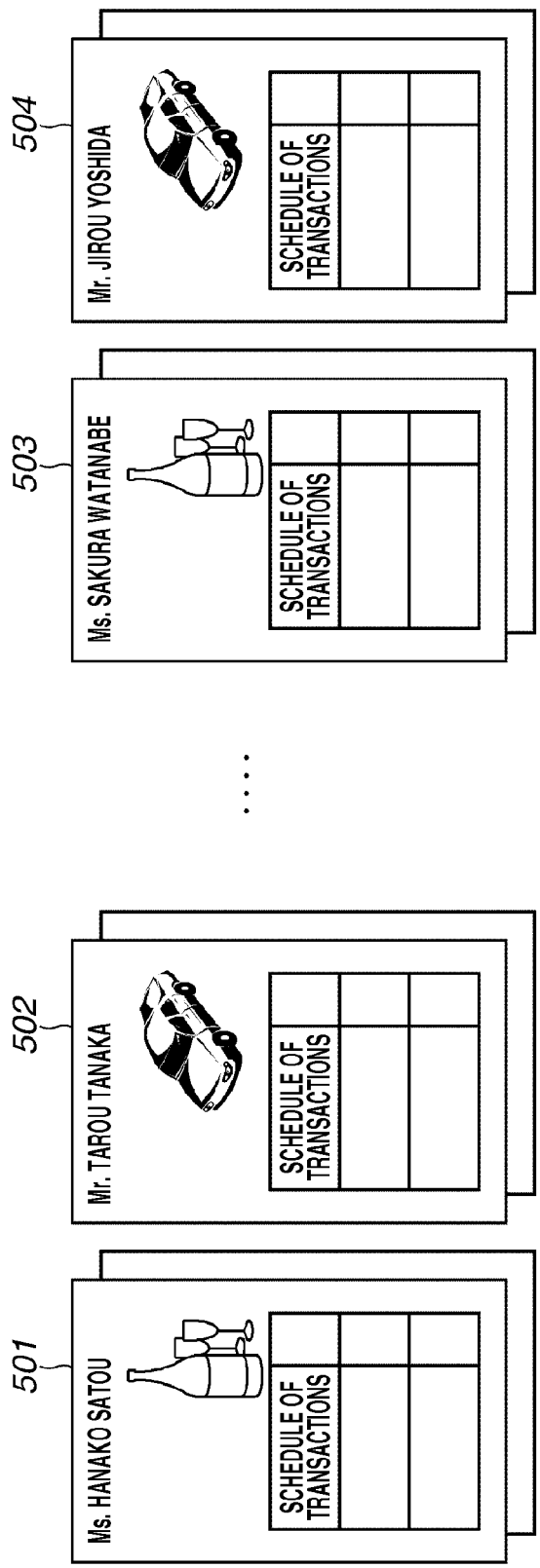

FIG.6A

| ATTRIBUTE INFORMATION | DATA |
|---|---|
| MEMBERSHIP NUMBER | NUMERIC CHARACTER |
| SHOP INFORMATION | CODE NUMBER |
| NAME | TEXT STRING |
| ADDRESS | TEXT STRING |
| TELEPHONE NUMBER | TEXT STRING |
| AGE | NUMERIC CHARACTER |
| HOBBY | CODE NUMBER |
| UTILIZED AMOUNT | NUMERIC CHARACTER |
| PURCHASE HISTORY | DATE/TEXT STRING/ NUMERIC CHARACTER |

FIG.6B

| ATTRIBUTE INFORMATION | DATA |
|---|---|
| MEMBERSHIP NUMBER | NUMERIC CHARACTER |
| SHOP INFORMATION | CODE NUMBER |
| NAME | TEXT STRING |
| ADDRESS | TEXT STRING |
| SEX | CODE NUMBER |
| AGE | NUMERIC CHARACTER |

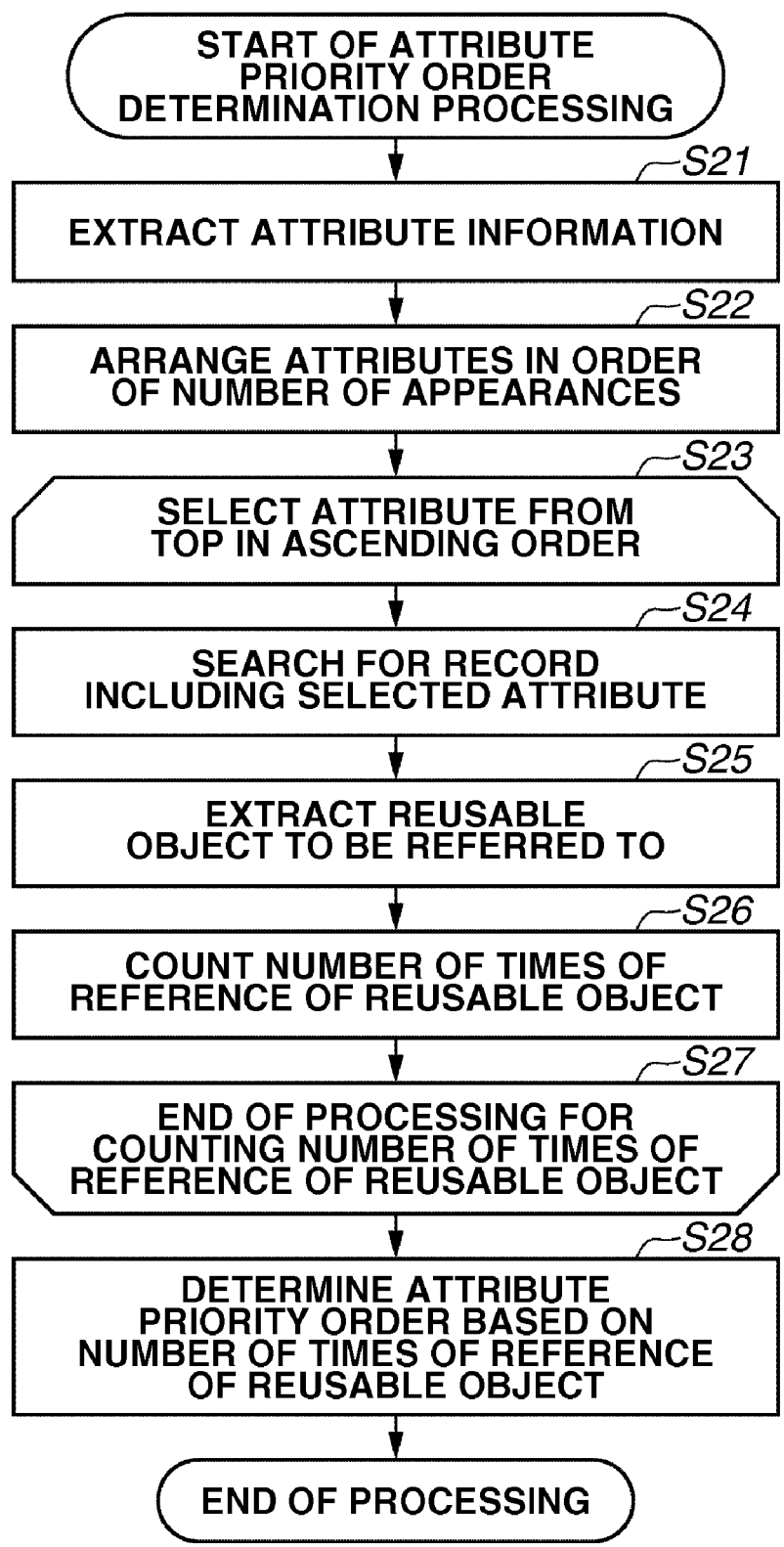

| PRIORITY ORDER | ATTRIBUTE INFORMATION | NUMBER OF APPEARANCES OF ATTRIBUTE |
|---|---|---|
| 4 | MEMBERSHIP NUMBER | 1 |
| 2 | SHOP INFORMATION | |
| 4 | NAME | 1 |
| 4 | ADDRESS | 1 |
| 1 | SEX | |
| 3 | AGE | |

702

| NUMBER OF APPEARANCES OF EACH ATTRIBUTE | | ObjA | ObjB | ObjC |
|---|---|---|---|---|
| SHOP A | 3000 | NONE | NONE | NONE |
| SHOP B | 2000 | NONE | NONE | NONE |
| SHOP C | 5000 | NONE | NONE | NONE |

703

| MALE | 3000 | 3000 | 0 | 3000 |
| FEMALE | 7000 | 7000 | 7000 | 0 |

704

| CUSTOMERS OF AGES 10 - 19 | 600 | NONE | NONE | NONE |
| CUSTOMERS IN 20s | 1500 | NONE | NONE | NONE |
| CUSTOMERS IN 30s | 3300 | NONE | NONE | NONE |
| CUSTOMERS IN 40s | 2100 | NONE | NONE | NONE |
| CUSTOMERS IN 50s | 1400 | NONE | NONE | NONE |
| CUSTOMERS IN 60s | 600 | NONE | NONE | NONE |
| OTHER CUSTOMERS | 500 | NONE | NONE | NONE |

INFORMATION PROCESSING APPARATUS, INFORMATION PROCESSING APPARATUS CONTROL METHOD, AND STORAGE MEDIUM

BACKGROUND OF THE INVENTION

1. Field of the Invention

The present invention relates to an information processing apparatus, an information processing apparatus control method, and a storage medium.

2. Description of the Related Art

In recent years, a printing method, termed variable data printing (VDP), has been put into practice. In VDP, private information, which is included in a monthly invoice or transaction specification and differs customer by customer, and a content that a customer, who receives a direct mail, may take interest in are appropriately selected uniquely for each customer and the selected private information and content are printed.

As a method that implements VDP, portable document format (PDF)/variable and transactional (VT) has been introduced. The PDF/VT is a data format, which is a sub set specification of PDF format regulated by Adobe° Systems, Inc. The specification of PDF/VT is currently being developed by International Organization for Standardization (ISO) and named ISO 1612-2 as a standard PDF format for variable printing.

As a characteristic of PDF/VT, PDF/VT includes "XObjects", which is a concept related to a drawing object, and "DPart", which is a concept related to management of attribute information. XObjects defines a drawing object as a reusable object. By using XObjects, a reusable object can be referred to from a PDF file a plurality of times.

In conventional PDF, it is necessary for an information processing apparatus that executes printing, to execute drawing of a drawing object included in print data for a number of times equivalent to the number of appearances of the drawing object in the print data. Suppose that the same corporate logo is included in all page data of 10,000 pages. In this case, it is necessary for an information processing apparatus to execute drawing of the same logo data 10,000 times in total for the pages. On the other hand, in PDF/VT, by using XObjects, the information processing apparatus can refer to a reusable object that appears in a first page, any number of times during processing of PDF data.

More specifically, if the information processing apparatus has generated intermediate data based on the reusable object that appears in the first page and if reference of the reusable object arises in a subsequent page, then the information processing apparatus generates a raster image (executes rasterization) based on the generated intermediate data. Accordingly, it becomes unnecessary for the information processing apparatus to generate intermediate data again based on the same reusable object for the subsequent page. Therefore, printing can be efficiently executed.

On the other hand, DPart is an information management area for managing attribute information in a hierarchical structure. By using DPart, a creator of PDF data can set an arbitrary attribute in PDF data.

In conventional PDF, it is necessary for an information processing apparatus to execute data processing in order of appearances of page information. However, by using DPart, i.e., by utilizing and referring to attribute information managed by DPart, the information processing apparatus can search for or extract and process a page including specific information. In addition, in this case, the information processing apparatus can group pages based on attribute information and process the group of pages. To paraphrase this, in PDF/VT, the information processing apparatus can efficiently execute processing by utilizing a reusable object in executing drawing of input data.

In PDF/VT also, an information processing apparatus may execute drawing in order of pages defined in input data. If an information processing apparatus processes data in order of pages defined in input data, the productivity may decrease because the throughput is affected after rasterization. The cause of degradation of productivity that may occur if a printing apparatus is used as the above-described information processing apparatus will be described below.

Suppose that a printing apparatus executes drawing of data in order of pages and that records including pages that refer to mutually different reusable objects successively exist. In this case, it is necessary for the printing apparatus to execute drawing of the reusable object every time the processing shifts to processing of a subsequent record. As a result, the printing capacity of the printing apparatus may decrease (i.e., a phenomenon of cycledown may occur).

In other words, if data to be printed is not ready at an appropriate timing, processing of a flow of print processing that is downstream thereof is suspended. This phenomenon is called "cycledown".

More specifically, a conventional printing apparatus, such as a printing apparatus having an electrophotographic type print engine or a printing apparatus that executes offset printing, includes a print engine that serially processes raster images transmitted from a drawing processing unit and transfers a toner or an ink onto a recording paper. The printing apparatus like this includes a mechanism that generates heat and uses a chemical agent during transfer processing.

Accordingly, if raster images are not transmitted from a drawing processing unit for a predetermined period of time, the printing apparatus suspends the processing in order to prevent otherwise possible mechanical affect on the print engine. If the operation of the printing apparatus is suspended during serial printing, several tens of seconds may be required to calibrate and recondition the printing apparatus, which is required to restore the printable operation status of the printing apparatus. In this case, the phenomenon of cycledown occurs.

Japanese Patent Application Laid-Open No. 2007-226465 discusses an image output system that determines the degree of overlap among part information that indicates variable data of a plurality of pages, divides and arranges the plurality of pages in descending order of the overlap degree, and outputs an image of each divided page.

Even in a printing apparatus that executes drawing by referring to a reusable object, the phenomenon of cycledown may occur when the printing apparatus executes drawing of data in order of pages defined in input data. In this case, the productivity may decrease.

If a direct mail having a plurality of pages is to be sent to one customer, it is desired to output a plurality of pages as one product in the unit of a predetermined attribute. In this case, the image output system discussed in Japanese Patent Application Laid-Open No. 2007-226465 cannot meet the desire.

To paraphrase this, in the image output system, a plurality of pages is divided into pages and an image is output in the unit of the divided page. Accordingly, all pages may not be image-processed by the same image forming apparatus (i.e., the pages may be image-processed by different image forming apparatuses).

More specifically, in the image output system discussed in Japanese Patent Application Laid-Open No. 2007-226465, in inserting the output product into an envelope, it is necessary to sort the print products for each customer, who is the target of sending the product, by using a sorter or by hand.

SUMMARY OF THE INVENTION

According to an aspect of the present invention, in an information processing apparatus configured to process print data including an object laid out on a page, the page data includes a variable object, which varies page by page, a shared object, which is referred to by a plurality of pages, and hierarchical attribute information about a page corresponding to the print data. The information processing apparatus according to an aspect of the present invention includes an attribute information analysis unit configured to analyze attribute information included in the print data, measure a number of appearances of an attribute in the print data, select an attribute in a predetermined layer based on the measured number of appearances of the attribute, and determine a priority order of the attribute based on a number of times of references to the shared object from a page corresponding to a record having the selected attribute, an intermediate data generation unit configured to serially select an attribute based on the determined priority order and configured, for the page corresponding to the selected attribute, to generate intermediate data based on an object corresponding to the page, and an image data generation unit configured to generate image data by rasterizing the intermediate data generated by the intermediate data generation unit. In the information processing apparatus, the intermediate data generation unit is configured to store intermediate data generated based on the shared object, of the generated intermediate data, in a predetermined storage unit, configured to extract the intermediate data from the storage unit for a page that refers to the shared object corresponding to the intermediate data that has been already stored on the storage unit, and configured to transfer the extracted intermediate data to the image data generation unit as intermediate data based on which the image data is to be generated.

According to an aspect of the present invention, an information processing apparatus is capable of preventing a phenomenon of cycledown when drawing is executed by referring to a reusable object. In addition, according to an aspect of the present invention, an information processing apparatus can output a plurality of pages as one product for each unit of a predetermined attribute.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

FIG. 5A illustrates an example of page data.

FIG. 6A illustrates an example of attribute information managed by an external apparatus. FIG. 6B illustrates an example of attribute information set to PDL data.

FIG. 8 is a flow chart illustrating an exemplary flow of attribute priority order determination processing.

FIGS. 9A and 9B illustrate processing for determining an order of attributes in the number of appearances of each attribute and processing for determining an attribute priority order.

DESCRIPTION OF THE EMBODIMENTS

Various exemplary embodiments, features, and aspects of the invention will be described in detail below with reference to the drawings.

Figure 13:
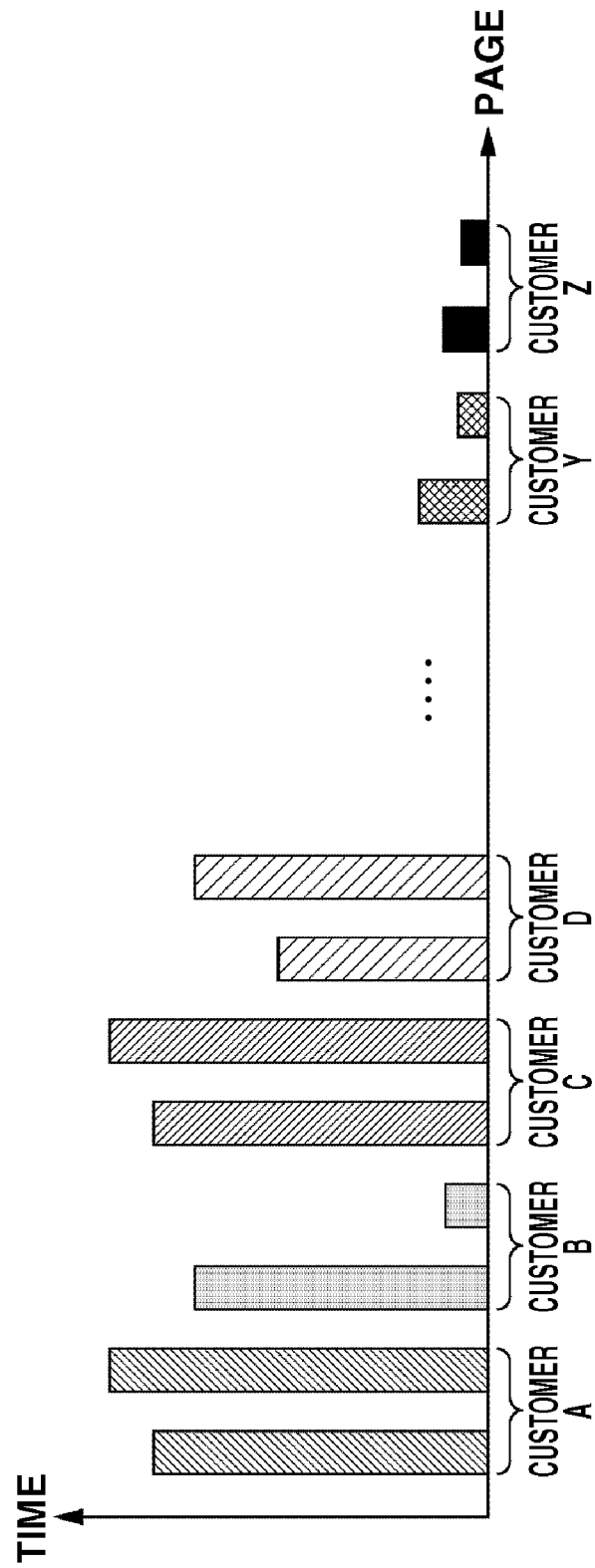
FIG. 13 illustrates a problem that may arise if the above-described conventional printing apparatus is used.

FIG. 13 is a graph illustrating the above-described problem that may occur in the above-described conventional printing apparatus that executes drawing of data in order of pages defined in input data. In the example illustrated in FIG. 13, a page is taken on the horizontal axis while time required for drawing a page is taken on the vertical axis. In the example illustrated in FIG. 13, it is supposed that the drawing is executed starting from a page corresponding to the left portion of the graph. Furthermore, in the example illustrated in FIG. 13, it is also supposed that a record corresponding to each customer has two pages.

Referring to FIG. 13, in processing a record executed immediately after drawing of print data is started (i.e., in drawing for a record corresponding to customers A through D, for example), a reusable object to be referred to for the first time appears every time a customer, which is a predetermined unit of attribute of the record, is changed. As a result, it takes a long time in completely executing drawing of the entire print data.

Figure 1:
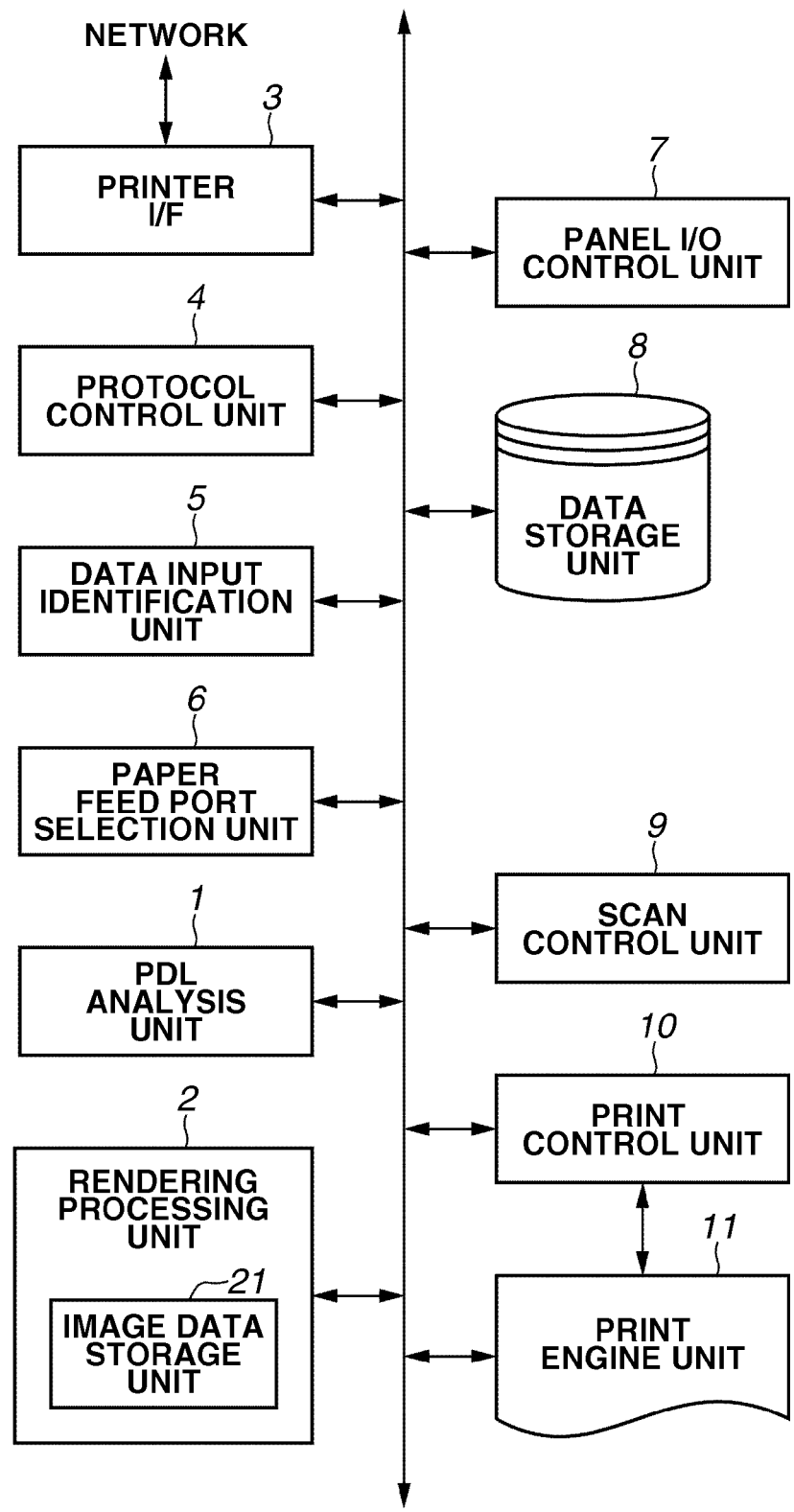
FIG. 1 is a functional block diagram of an information processing apparatus according to an exemplary embodiment of the present invention.

FIG. 1 is a functional block diagram of an information processing apparatus according to an exemplary embodiment of the present invention. The information processing apparatus illustrated in FIG. 1 processes print data including objects laid out on a page. In the example illustrated in FIG. 1, the information processing apparatus processes PDL data of a PDF format that complies with PDF/VT.

In addition, the PDL data, which will be described in detail below with reference to FIG. 4, includes a variable object, a reusable object, and hierarchical attribute information of a page. A variable object is an object that differs page by page (i.e., a variable object), such as private information about a customer. The variable object is included in each page.

A reusable object is a shared object, which is referred to by a plurality of pages. The reusable object is an object commonly provided to a plurality of customers, such as a promotion image.

The information processing apparatus according to the present exemplary embodiment is capable of processing PostScript® of Adobe® Systems, Inc. and printer control language (PCL) of Hewlett-Packard Development Company, L.P. In addition, the information processing apparatus according to the present exemplary embodiment is also capable of processing an image compression format, such as Joint Photographic Experts Group (JPEG) or Tag Image File Format (TIFF).

In the example illustrated in FIG. 1, the information processing apparatus includes a PDL analysis unit 1, a rendering processing unit 2, a printer interface (I/F) 3, and a protocol control unit 4. In addition, the information processing apparatus according to the present exemplary embodiment includes a data input identification unit 5, a paper feed port selection unit 6, a panel input/output (I/O) control unit 7, and a data storage unit 8. Furthermore, the information processing apparatus according to the present exemplary embodiment includes a scan control unit 9, a printing control unit 10, and a print engine unit 11.

The PDL analysis unit 1 analyzes PDL data that the protocol control unit 4 receives. In addition, the PDL analysis unit 1 generates an intermediate code based on an object included in the PDL data. The intermediate code is intermediate data processed (image-processed) by the rendering processing unit 2. In the present exemplary embodiment, the intermediate code is also referred to as a display list (DL).

The PDL analysis unit 1 transfers the generated intermediate code to the rendering processing unit 2. The rendering processing unit 2 rasterizes the intermediate code transferred from the PDL analysis unit 1 into bitmap data. In other words, the rendering processing unit 2 rasterizes the information about the object corresponding to the intermediate code as a raster image (executes rasterization). The rendering processing unit 2 stores the raster image on the image data storage unit 21 as image data. To paraphrase this, the rendering processing unit 2 functions as an image data generation unit that rasterizes the generated intermediate data and generates image data based on the rasterized intermediate data.

The printer I/F 3 is an interface for communicating with one or more external apparatuses via a network. The protocol control unit 4 analyzes and transmits a network protocol to execute a communication with an external apparatus via the printer I/F 3. More specifically, the protocol control unit 4 receives PDL data corresponding to a print job input by the external apparatus via the printer I/F 3.

A plurality of printer I/Fs 3 and a plurality of protocol control units 4 can be provided in the information processing apparatus for each network interface card (NIC) connected to the information processing apparatus. In addition, PDL data input by a plurality of NICs can be processed by the same predetermined control unit.

The data input identification unit 5 identifies via which network the print job has been input. The paper feed port selection unit 6 selects a paper feed port used when the print engine unit 11 prints and outputs the image data. More specifically, the paper feed port selection unit 6 selects a paper feed port according to the paper feed port designation command included in the print job. The selection of the paper feed port by the paper feed port selection unit 6 can be executed based on a command that designates the paper size and the paper type.

The panel I/O control unit 7 controls an input and an output executed via an operation panel. The data storage unit 8 is a storage unit that stores data input to the information processing apparatus or data generated by the information processing apparatus. The data storage unit 8 is implemented by a secondary storage device, such as a hard disk.

The scan control unit 9 executes various processing, such as correction, image processing, and editing on image data input to the information processing apparatus from a scanner. The printing control unit 10 extracts image data from the image data storage unit 21 included in the rendering processing unit 2. In addition, the printing control unit 10 converts the extracted image data into a predetermined signal compliant with a print and output format. Furthermore, the printing control unit 10 transmits the converted image signal to the print engine unit 11. The print engine unit 11 receives the signal transmitted from the printing control unit 10, and prints and outputs the received signal.

The information processing apparatus control method according to the present exemplary embodiment and a computer program storing the information processing apparatus control method are implemented by each functional units of the information processing apparatus illustrated in FIG. 1.

Figure 2:
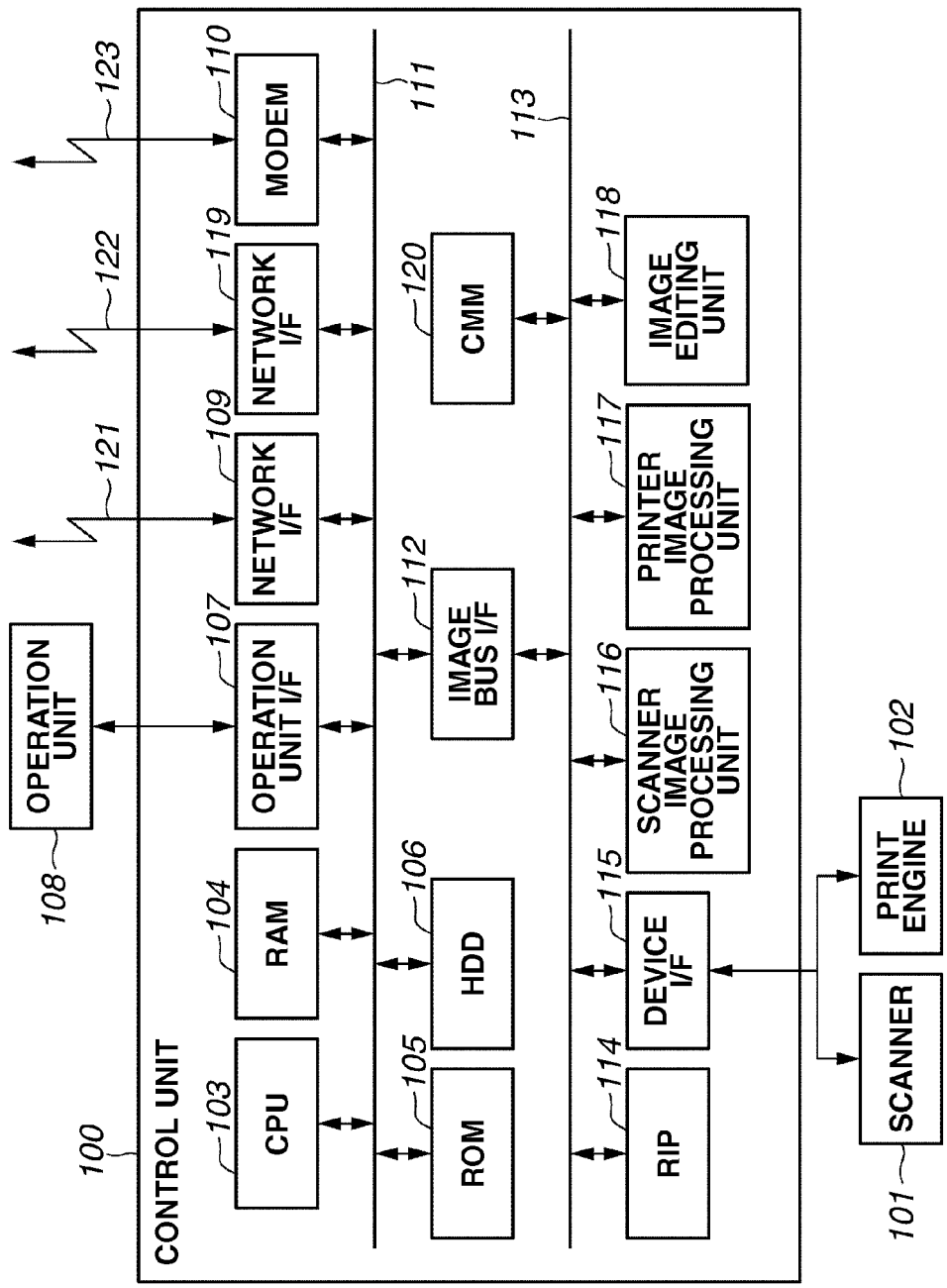
FIG. 2 illustrates an exemplary hardware configuration of the information processing apparatus according to an exemplary embodiment of the present invention.

FIG. 2 illustrates an exemplary hardware configuration of the information processing apparatus according to the present exemplary embodiment. Referring to FIG. 2, the information processing apparatus includes hardware resources, such as a control unit 100, a scanner 101, a print engine 102, and the operation unit 108.

The control unit 100 executes image data reading processing via the scanner 101. In addition, the control unit 100 executes print and output processing via the print engine 102. Furthermore, the control unit 100 receives PDL data via the operation unit 108, local area networks (LANs) 121 and 122, or a public line 123. Moreover, the control unit 100 executes analysis and drawing on the received PDL data.

The control unit 100 includes a central processing unit (CPU) 103, a random access memory (RAM) 104, and a read-only memory (ROM) 105. In addition, the control unit 100 includes a hard disk drive (HDD) 106, an operation unit I/F 107, and network I/Fs 109 and 119. Moreover, the control unit 100 includes a modem 110 and an image bus I/F 112. The above-described units of the information processing apparatus, i.e., the CPU 103 through the image bus I/F 112, are in communication with one another via a system bus 111.

In addition, the control unit 100 includes a raster image processor (RIP) 114 and a device I/F 115. Furthermore, the control unit 100 includes a scanner image processing unit 116, a printer image processing unit 117, an image editing unit 118, and a color management module (CMM) 120.

The CPU 103 is a control device configured to control the operation of the entire control unit 100. More specifically, the CPU 103 receives PDL data via the operation unit I/F 107, the network I/F 109, or the network I/F 119. In addition, the CPU 103 analyzes the received PDL data and generates an intermediate code. Furthermore, the CPU 103 stores the generated intermediate code on the HDD 106.

The RAM 104 functions as a system work memory used by the CPU 103 to execute various processing. In addition, the RAM 104 also functions as an image memory that temporarily stores the input image data. The ROM 105 is a boot ROM, which previously stores a system boot program. The HDD 106 stores system software and data input for various processing. More specifically, the HDD 106, stores the intermediate code acquired by the CPU 103 by analyzing PDL data.

The operation unit I/F 107 is an interface with the operation unit 108. The operation unit I/F 107 provides data to be displayed on an operation screen (operation screen data). The operation screen data is used for displaying an operation screen on the operation unit 108, via which a user of the information processing apparatus executes an operation. The operation unit I/F 107 transmits information input by the user via the operation screen displayed on the operation unit 108 to the CPU 103.

The network I/Fs 109 and 119 are connected to the LANs 121 and 122, respectively. Each of the network I/Fs 109 and 119 is an interface for inputting and outputting information from and to an external apparatus. The information processing apparatus illustrated in FIG. 1 includes two network I/Fs. However, the number of network I/Fs included in the information processing apparatus according to the present exemplary embodiment is not limited to two. In other words, the image forming apparatus can include one network I/F or two or more network I/Fs.

The modem 110 is connected to the public line 123. The modem 110 functions as an interface with an external apparatus for inputting and outputting information from and to the external apparatus.

The image bus I/F 112 is an interface between the system bus 111 and an image bus 113. The image bus I/F 112 converts a data structure of data on the system bus 111 into a data structure of data on the image bus 113. The image bus 113 is a data bus for transferring image data.

The RIP 114 receives an intermediate code from the HDD 106 and rasterizes the intermediate code into an image to generate image data. The device I/F 115 is an interface between the scanner 101 and the print engine 102 and the control unit 100. In addition, the device I/F 115 executes synchronous/asynchronous conversion of image data.

The scanner image processing unit 116 executes various processing, such as correction, image processing, and editing on image data input by the scanner 101. The printer image processing unit 117 executes various processing, such as correction and resolution conversion, on image data to be printed and output.

The image editing unit 118 executes various types image processing, such as rotation, compression, and decompression. The CMM 120 is a dedicated hardware module for executing color conversion (color space conversion) on image data based on a profile and calibration data.

A profile is information for converting color image data expressed in a color space dependent on the device into a color space that is not dependent on the device, such as L*a*b*. The calibration data is data for calibrating color reproduction characteristics of the scanner 101 and the print engine 102.

Figure 3:
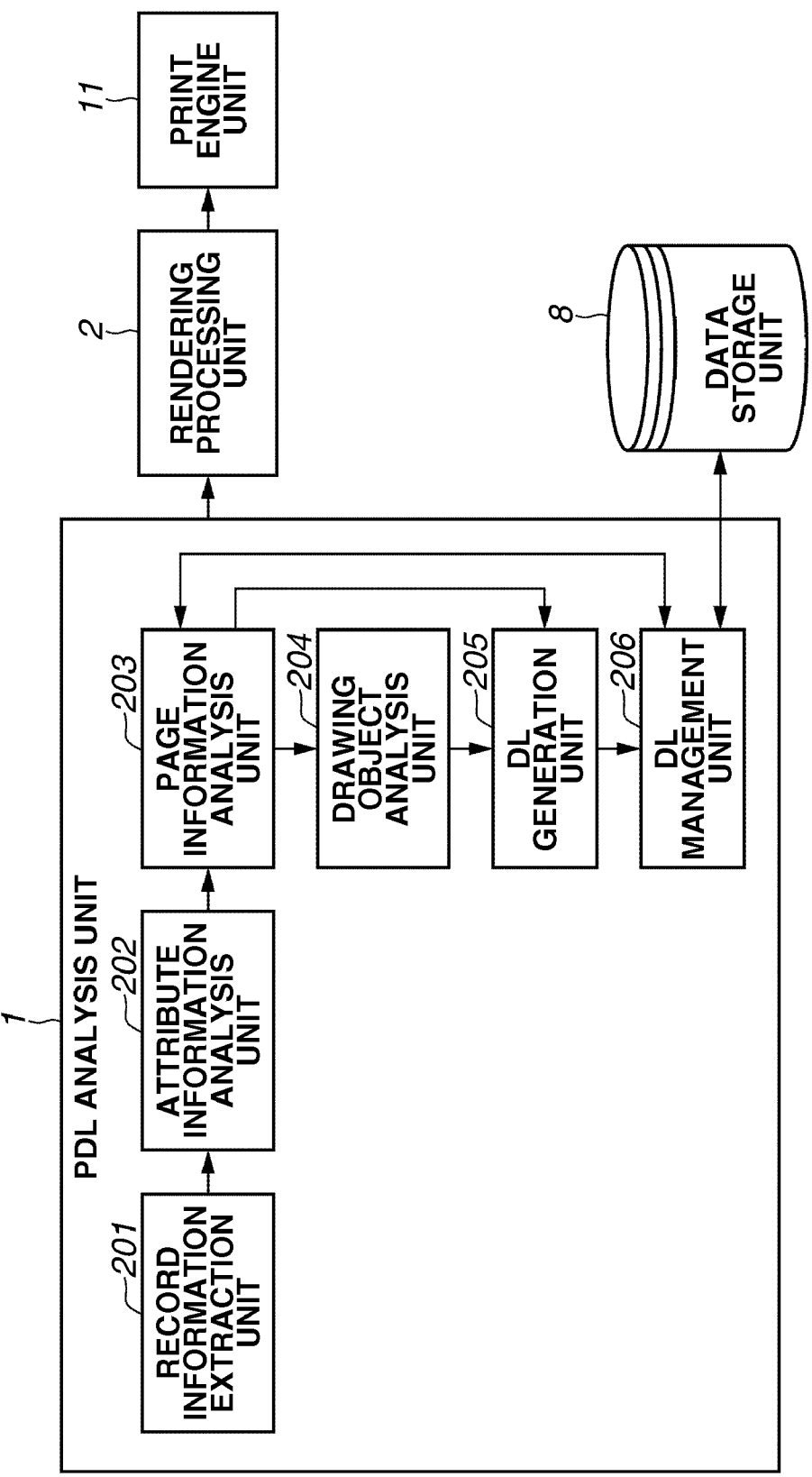
FIG. 3 illustrates an exemplary configuration of a PDL analysis unit.

FIG. 3 illustrates an exemplary configuration of the PDL analysis unit 1 according to the present exemplary embodiment. Referring to FIG. 3, the PDL analysis unit 1 includes a record information extraction unit 201, an attribute information analysis unit 202, a page information analysis unit 203, a drawing object analysis unit 204, a DL generation unit 205, and a DL management unit 206.

The record information extraction unit 201 extracts information about a record included in PDL data input to the information processing apparatus via the printer I/F 3 (FIG. 1) (record information). The record information at least includes information about a page included in each record.

The record information extraction unit 201 transfers record information to the attribute information analysis unit 202. The attribute information analysis unit 202 functions as an attribute information analysis unit configured to analyze attribute information included in PDL data.

The attribute information is information corresponding to (included in) PDL data. As will be described in detail with reference to FIG. 5, the attribute information has a hierarchical structure.

More specifically, the attribute information analysis unit 202 measures the number of appearances of an attribute in the PDL data. In addition, the attribute information analysis unit 202 selects an attribute in a predetermined layer based on the measured number of appearances of the attribute.

Moreover, the attribute information analysis unit 202 measures the number of times of references to a reusable object from a page corresponding to a record that includes the selected attribute. In addition, the attribute information analysis unit 202 determines a priority order of the attribute based on a result of the measurement.

The priority order of attribute is a priority order for executing drawing of a record including an attribute. The drawing includes processing for generating intermediate data based on a drawing object corresponding to a page and processing for generating a raster image based on the generated intermediate data (rasterizing processing). The higher the priority order of an attribute is, the higher the priority of executing drawing on the attribute becomes.

The attribute information analysis unit 202 transfers the record information transferred from the information extraction unit 201 to the page information analysis unit 203. The page information analysis unit 203 analyzes PDL data included in page information.

The page information is information about an object corresponding to a page (i.e., information about a variable object and a reusable object). More specifically, the page information analysis unit 203 serially selects an attribute according to the priority order of the attribute determined by the attribute information analysis unit 202.

The page information analysis unit 203 identifies a page included in a record that includes the selected attribute by using the record information. In addition, the page information analysis unit 203 analyzes the page information about the identified page to identify the variable object included in the page and a reusable object to which the page refers.

Furthermore, the page information analysis unit 203 receives a display list, which is the intermediate code, from the DL management unit 206. Moreover, the page information analysis unit 203 transfers the received display list to the rendering processing unit 2.

In addition, if a page refers to a reusable object that has been already referred to by another page, the page information analysis unit 203 notifies the DL management unit 206 and the DL generation unit 205 that the page has referred to the reusable object which has been already referred to by another page.

The drawing object analysis unit 204 analyzes a drawing object included in PDL data based on a result of the analysis of page information executed by the page information analysis unit 203. The drawing object included in PDL data includes a drawing object corresponding to a variable object and another drawing object corresponding to a reusable object.

The DL generation unit 205 generates a display list as an intermediate code based on a result of the analysis on the drawing object executed by the drawing object analysis unit 204. If it is notified from the page information analysis unit 203 that a page has referred to a reusable object that has been already referred to by another page, the DL generation unit 205 generates the display list based on the variable object without generating a display list based on the reusable object.

The DL management unit 206 manages the display list generated by the DL generation unit 205. The DL management unit 206 transfers the display list to the page information analysis unit 203. The DL management unit 206 executes the following processing for a page that refers to the reusable object for the first time.

More specifically, the DL management unit 206 transfers the display list generated based on the variable object and the display list generated based on the reusable object to the page information analysis unit 203. In addition, the DL management unit 206 stores the display list generated based on the reusable object in the data storage unit 8.

Furthermore, the DL management unit 206 executes the following processing if it is notified that a page has referred to a reusable object that has been already referred to by another page, from the page information analysis unit 203. More specifically, the DL management unit 206 extracts the display list generated based on the reusable object that has been already referred to from the data storage unit 8.

In addition, the DL management unit 206 transfers the extracted display list to the page information analysis unit 203. Furthermore, the DL management unit 206 transfers the display list generated based on the variable object to the page information analysis unit 203.

Each of the page information analysis unit 203, the drawing object analysis unit 204, the DL generation unit 205, and the DL management unit 206 described above functions as an intermediate data generation unit. The intermediate data generation unit serially selects an attribute according to the determined priority order of attribute. In addition, for a page corresponding to the selected attribute, the intermediate data generation unit generates intermediate data based on an object corresponding to the page.

In addition, the intermediate data generation unit stores the intermediate data (display list) based on the reusable object, of the intermediate data generated in the above-described manner, on a predetermined storage unit (the data storage unit 8). For a page that refers to the reusable object corresponding to the display list that has already been stored on the data storage unit 8, the intermediate data generation unit extracts a display list from the data storage unit 8 and transfers the extracted display list to the rendering processing unit 2 as a generate target image data based thereon.

The rendering processing unit 2 generates a raster image based on the display list transferred from the page information analysis unit 203. The print engine unit 11 prints and outputs the generated raster image.

Figure 4:
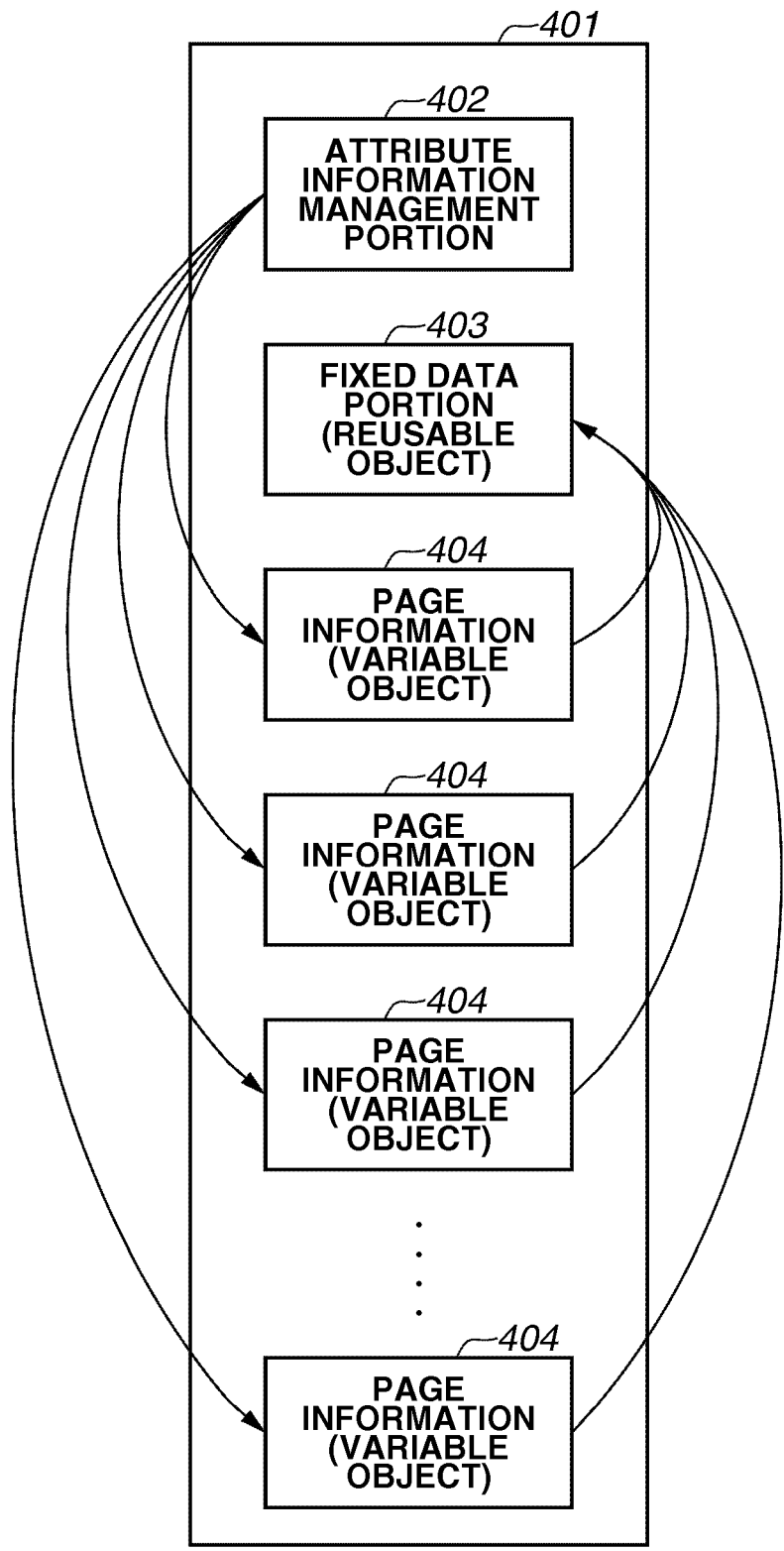
FIG. 4 illustrates an exemplary structure of PDL data, which is processed by the PDL analysis unit.

FIG. 4 illustrates an exemplary structure of PDL data, which is processed by the PDL analysis unit 1 according to the present exemplary embodiment. In the example illustrated in FIG. 4, an exemplary structure of PDL data having the PDF format defined and regulated by PDF/VT is illustrated. Referring to FIG. 4, PDL data 401 includes an attribute information management portion 402, a fixed data portion 403, and a plurality of pieces of page information 404.

The attribute information management portion 402 includes attribute information about a page included in the PDL data. The attribute described in the attribute information is described by text string information, a numeral, or a code number. The information processing apparatus can identify and search for data corresponding to a page of each customer (page data) based on the attribute information. In addition, the attribute information management portion 402 includes record information.

The page information 404 corresponds to each page. The page information 404 includes information about a variable object and information about a link to the reusable object referred to by a page. The fixed data portion 403 includes a reusable object.

Figure 5B:
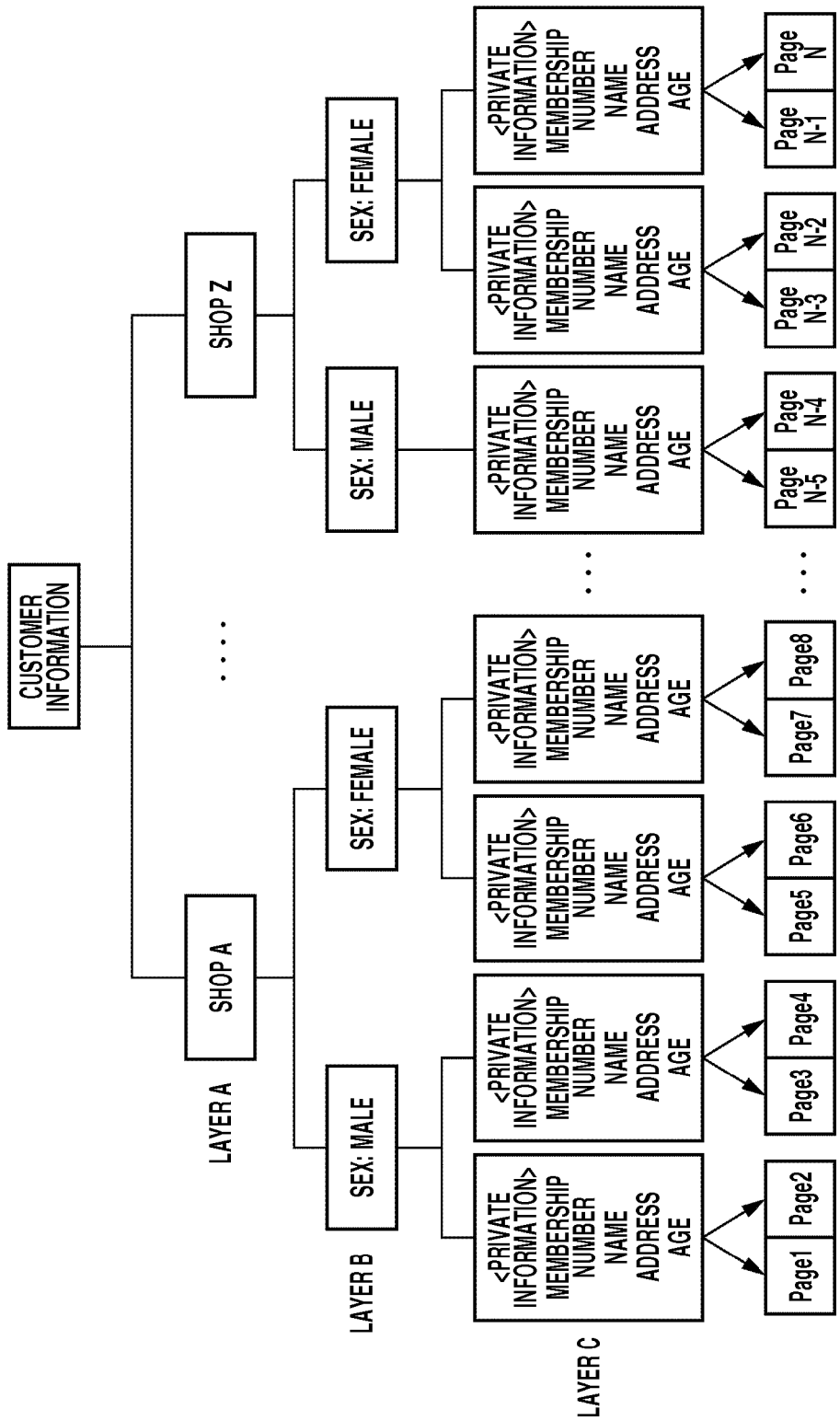
FIG. 5B illustrates an exemplary structure of attribute information.

FIG. 5A illustrates an example of page data included in the PDL data illustrated in FIG. 4. FIG. 5B illustrates an exemplary structure of attribute information included in the PDL data illustrated in FIG. 4. More specifically, FIG. 5A illustrates an example of page data of each customer. Referring to FIG. 5A, page data 501 through 504 correspond to a mutually different customer.

FIG. 5B illustrates an exemplary structure of the PDL data included in the attribute information. With reference to the example illustrated in FIG. 5B, an exemplary data structure of customer information will be described in detail below.

The attribute information illustrated in FIG. 5B has a hierarchical structure. More specifically, an attribute corresponding to a layer A includes information about a shop which the customer utilizes. An attribute corresponding to a layer B, which is a lower layer immediately below the layer A, includes information about the sex of the customer.

In addition, an attribute corresponding to a layer C, which is a lower layer immediately below the layer B, includes private information of the customer, such as a membership number, the address, and the age. Each private information includes information about a link to corresponding page information.

The creator of the PDL data and an application for generating the PDL data can arbitrarily set the hierarchical structure of the attribute information and the attribute corresponding to each layer.

FIG. 6A illustrates an example of attribute information managed by an external apparatus that inputs PDL data to the information processing apparatus. FIG. 6B illustrates an example of attribute information set to the input PDL data. More specifically, FIG. 6A illustrates an example of attribute information managed by an external apparatus. FIG. 6B illustrates an example of attribute information set to the PDL data.

The item "attribute information" illustrated in FIGS. 6A and 6B describes each attribute. The item "data" describes a data format of the attribute. The creator of the PDL data, who operates the external apparatus, can set arbitrary attribute information to the PDL data.

More specifically, the creator of the PDL data selects the membership number, the shop information, the name, the address, and the age from the attribute information illustrated in FIG. 6A. In addition, the creator of the PDL data sets the attribute selected as described above and the arbitrarily added attribute "sex" as the attribute information set to the PDL data.

Figure 7:
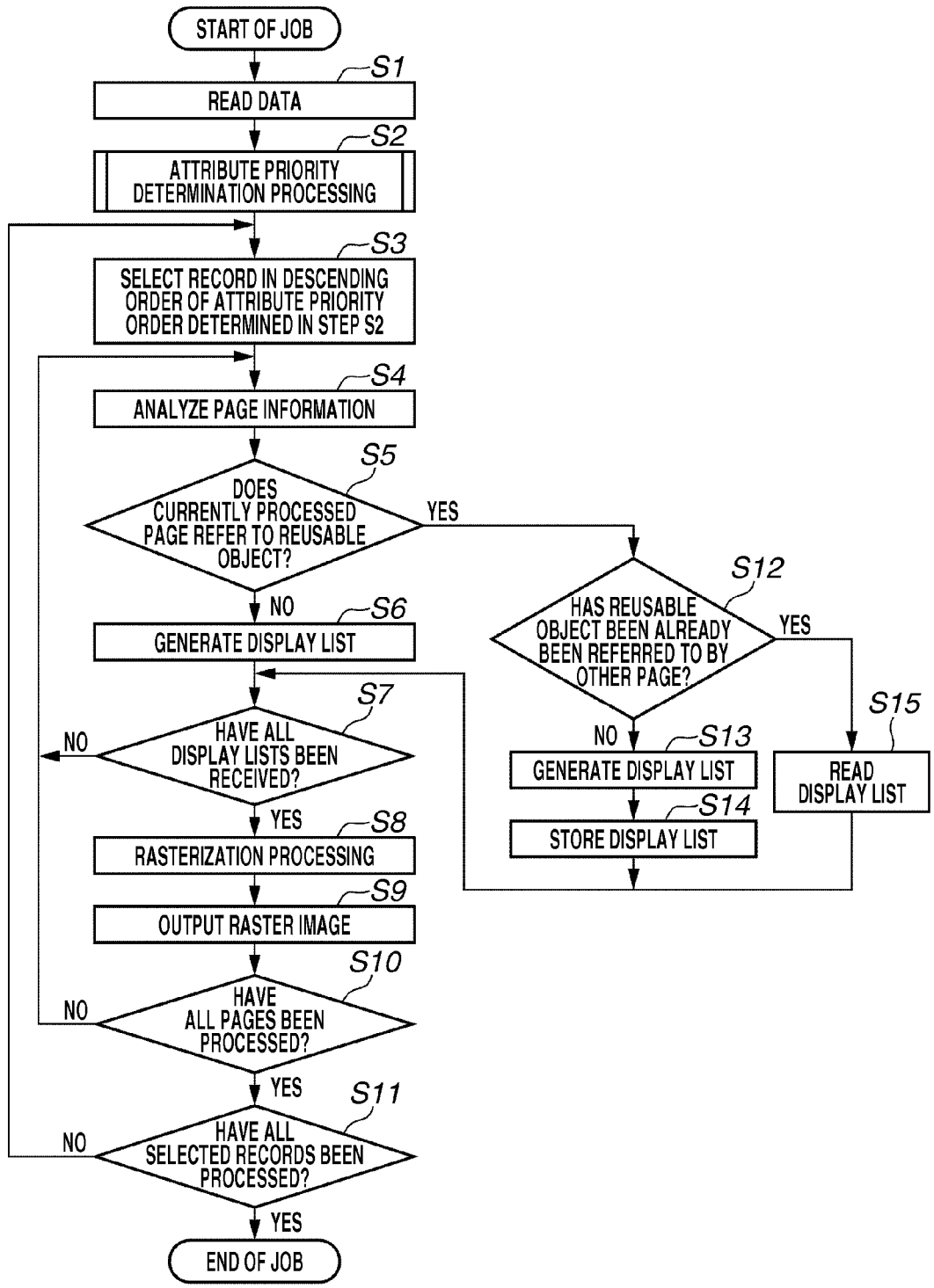
FIG. 7 is a flow chart illustrating an exemplary flow of processing executed by an information processing apparatus according to a first exemplary embodiment of the present invention.

FIG. 7 is a flow chart illustrating an exemplary flow of processing executed by an information processing apparatus according to a first exemplary embodiment of the present invention.

Referring to FIG. 7, in step S1, the information processing apparatus receives a print job from the external apparatus via the printer I/F 3. In addition, the information processing apparatus reads the print job included in the PDL data.

In addition, in step S1, the information extraction unit 201 extracts record information from PDL data. In addition, the information extraction unit 201 transfers the extracted record information to the page information analysis unit 203 via the attribute information analysis unit 202.

In step S2, the attribute information analysis unit 202 of the PDL analysis unit 1 executes attribute priority order determination processing. In step S3, the page information analysis unit 203 selects a record in descending order of the determined attribute priority.

In step S4, the page information analysis unit 203 analyzes the page information about a page included in the record selected in step S3.

In step S5, the page information analysis unit 203 determines whether the currently processed page refers to a reusable object. If it is determined that the currently processed page does not refer to a reusable object (NO in step S5), then the following processing is executed.

More specifically, in step S6, the DL generation unit 205 generates a display list corresponding to a variable object. Furthermore, the DL management unit 206 transmits the generated display list to the page information analysis unit 203. Then the processing advances to step S7.

On the other hand, if it is determined that the currently processed page refers to a reusable object (Yes in step S5), then the processing advances to step S12. In step S12, the page information analysis unit 203 determines whether the reusable object has been already referred to by another page.

If it is determined that the reusable object has been already referred to by another page (Yes in step S12), then the processing advances to step S15. In step S15, the DL management unit 206 reads a display list corresponding to the reusable object from the data storage unit 8. In addition, in step S15, the DL management unit 206 transmits the read display list to the page information analysis unit 203.

On the other hand, if it is determined that the reusable object has not been referred to by another page yet (No in step S12), then the processing advances to step S13. In step S13, the DL generation unit 205 generates a display list corresponding to the reusable object. In addition, in step S13, the DL management unit 206 stores the display list generated in step S13 on the data storage unit 8.

In step S7, the page information analysis unit 203 determines whether all the display lists corresponding to the object described in the page information have been received from the DL management unit 206. If it is determined that any display list that has not been received remains (No in step S7), then the processing returns to step S4. On the other hand, if it is determined that all the display lists corresponding to the object described in the page information have been received from the DL management unit 206 (Yes in step S7), then the processing advances to step S8.

In step S8, the rendering processing unit 2 executes rasterization and generates a raster image. In step S9, the print engine unit 11 prints and outputs the raster image generated in step S8.

In step S10, the page information analysis unit 203 determines whether all the pages included in the record selected in step S3 have been completely processed. If it is determined that any unprocessed page remains (No in step S10), then the processing returns to step S4. On the other hand, if it is determined that all the pages included in the record selected in step S3 have been completely processed (Yes in step S10), then the processing advances to step S11. In step S11, the page information analysis unit 203 determines whether all the records selected in step S3 have been completely processed.

If it is determined that any unprocessed record remains (No in step S11), then the processing advances to step S3. On the other hand, if it is determined that all the records selected in step S3 have been completely processed (Yes in step S11), then the PDL analysis unit 1 ends the processing of the print job.

FIG. 8 is a flow chart illustrating an exemplary flow of attribute priority order determination processing executed in step S2 (FIG. 7).

Referring to FIG. 8, in step S21, the attribute information analysis unit 202 of the PDL analysis unit 1 extracts attribute information from the attribute information management portion 402 (FIG. 4) of the PDL data read in step S1 (FIG. 7).

In step S22, the attribute information analysis unit 202 analyzes the extracted attribute information. In addition, the attribute information analysis unit 202 sorts out (determines order of) the attributes described in the PDL data based on the number of appearances of the attribute in the PDL data.

In step S22, the attribute information analysis unit 202 classifies the attributes corresponding to each page. Furthermore, the attribute information analysis unit 202 measures the number of appearances of the attribute in the PDL data. Based on the determined number of appearances, the attribute information analysis unit 202 determines the order of the attributes in descending order of the number of appearances in the PDL data.

Figure 9A:
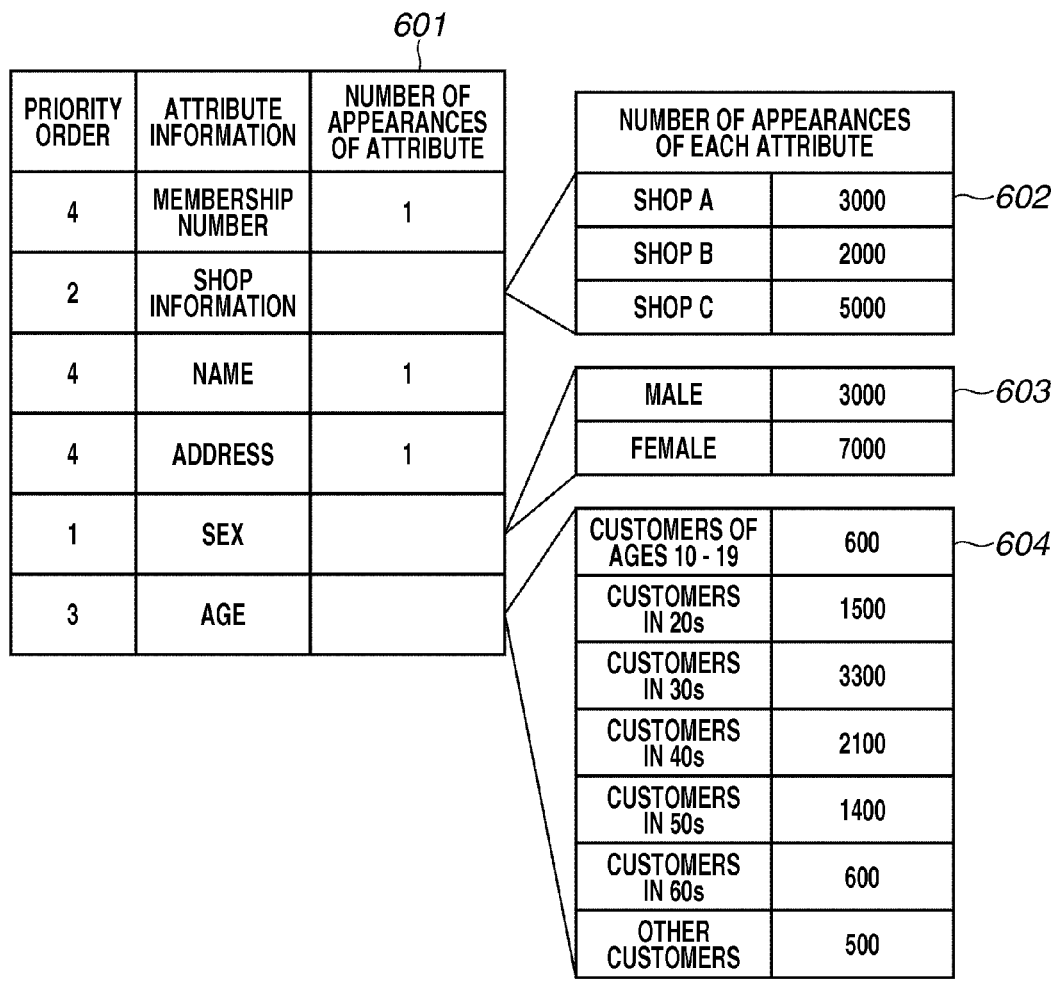

FIG. 9A illustrates an example of the attribute order determination processing executed based on the number of appearances in the PDL data, which is executed in step S22 illustrated in FIG. 8.

Referring to FIG. 9A, a table 601 stores the number of appearances and the priority order of each attribute. In the example illustrated in FIG. 9A, attributes included in the customer information, such as the membership number, the shop information, the name, the address, the sex, and the age are used in the attribute priority order determination. In the example illustrated in FIG. 9A, tables 602 through 604 store the number of appearances of each attribute, such as the shop information, the sex, and the age.

In the table 602, shops A through C are attributes in a lower layer below the attribute "shop information". In the table 603, "male" and "female" are attributes in a lower layer below the attribute "sex". In the table 604, "ages 10 to 19" and "other ages" are attributes in a lower layer below the attribute "age".

For each attribute included in the table 601, the attribute information analysis unit 202 selects an attribute in the lower layer having the highest number of appearances among that of the other attributes in the same layer. Furthermore, the attribute information analysis unit 202 compares the number of appearances and determines the priority order of each attribute based on a result of the comparison executed based on the number of appearances.

In the example illustrated in FIG. 9A, the number of appearances is high in order of "female", "shop C", and "30s". The number of appearances of the membership number, the name, and the address is "1"

Accordingly, the attribute information analysis unit 202 determines that the attribute "sex", which is an attribute in an upper layer of the lower layer attribute "female", has the highest priority order. In addition, the attribute information analysis unit 202 determines that the attribute "shop information", which is an attribute in an upper layer of the lower layer attribute "shop C", has the second highest priority order. Furthermore, the attribute information analysis unit 202 determines that the attribute "age", which is an attribute in an upper layer of the lower layer attribute "30s", has the third highest priority order. Moreover, the attribute information analysis unit 202 determines that the attributes "membership number", "name", and "address" have the fourth highest priority order.

Returning to FIG. 8, in step S23, the attribute information analysis unit 202 selects the attribute whose priority order has been determined in step S22 in descending order of the priority order thereof. More specifically, in steps S22 and step S23, the attribute information analysis unit 202 executes the following processing.

The attribute information analysis unit 202 measures the number of appearances of the attribute in the first layer of the PDL data. In addition, the attribute information analysis unit 202 selects an attribute in the second layer, which is a higher-order layer than the first layer (i.e., the "sex", for example) and related to the first layer attribute (i.e., "female", for example), based on the number of appearances of the attribute in the first layer. In the present exemplary embodiment, the above-described "first layer" is not limited to a layer immediately below the selected second layer.

Subsequently, the attribute information analysis unit 202 executes processing in steps S24 through S27. In step S24, the attribute information analysis unit 202 searches for a record that includes the selected attribute. More specifically, in step S24, the attribute information analysis unit 202 searches for a record based on the record information transferred from the information extraction unit 201 in step S1 illustrated in FIG. 7 and the selected attribute. To paraphrase this, the attribute information analysis unit 202 searches for a record that includes the attribute "sex", whose number of appearances is the highest.

In step S25, the attribute information analysis unit 202 extracts a reusable object referred to by a page included in the record extracted in step S24 from the PDL data. In step S26, the attribute information analysis unit 202 measures the number of times of references for each extracted reusable object.

In step S27, the attribute information analysis unit 202 verifies whether the processing in steps S23 through S26 described above have been completely processed on all the attributes. If it is verified by the attribute information analysis unit 202 that the processing in steps S23 through S26 described above have been completely processed on all the attributes, then the processing advances to step S28.

In step S28, the attribute information analysis unit 202 determines the priority order of the attribute based on the number of times of references to the reusable object measured in step S26. More specifically, the attribute information analysis unit 202 determines the priority order of the attribute in the lower layer (the first layer) of the attribute selected in step S23 (the attribute in the second layer).

More specifically, the attribute information analysis unit 202 determines the priority order of the attribute in the first layer related to the attribute in the second layer based on the number of times of references to the reusable object from the page corresponding to the attribute in the selected second layer. To paraphrase this, the attribute information analysis unit 202 determines the priority order of the attribute in the lower layer based on the number of times of references to the reusable object dependent on the attribute in the lower layer for each attribute in the lower layer of the layer of the selected attribute.

The number of times of references to the reusable object dependent on the attribute in the lower layer is equivalent to the number of times of references to the reusable object that appears biased toward the attribute.

The processing unit (functional unit) of the information processing apparatus that functions as the intermediate data generation unit serially selects the attribute in the first layer according to the priority order determined in step S28. In addition, the intermediate data generation unit generates intermediate data (the display list) for the page corresponding to the selected attribute in the first layer.

FIG. 9B illustrates an example of the attribute priority order determination processing executed in steps S23 through S28 illustrated in FIG. 8 based on the number of times of references to the object. Referring to FIG. 9B, a table 701 stores the priority order of the attribute included in the customer information. Tables 702 through 704 stores a result of measurement of the number of times of references to the reusable object of the page having each attribute for each attribute in the lower layer (the first layer), which is an attribute in a lower-order layer to the second layer, such as "shop information", "sex", and "age". In the example illustrated in FIG. 9A, objects "ObjA" through "ObjC" are reusable objects.

In the present exemplary embodiment, it is supposed that the attribute information analysis unit 202 has selected the attribute "sex", whose priority order is the highest, in step S23 illustrated in FIG. 8. It can be known from the table 703 that the number of times of references of each of the objects ObjA through ObjC, which are objects of the attribute "male" (the attribute in the lower layer of the attribute "sex" in the upper layer) is "3,000", "0", and "3,000", respectively. Furthermore, it can be also known from the table 703 that the number of times of references of each of the objects ObjA through ObjC of the attribute "female" is "7,000", "7,000", and "0", respectively.

Accordingly, the number of times of references to the reusable object dependent on the attribute "male" is "3,000", which is the number of times of references to the object ObjC. In addition, the number of times of references to the reusable object dependent on the attribute "female" is "7,000", which is the number of times of references to the object ObjB.

As a result, in step S28 illustrated in FIG. 8, the attribute information analysis unit 202 sets the priority order of the attribute "female" as the highest while setting the priority order of the attribute "male" as the second highest.

As described above, in the example illustrated in FIG. 9B, the attribute information analysis unit 202 determines the priority order of the attribute in the first layer related to the attribute in the selected second layer. However, the attribute priority order determination processing executed by the information processing apparatus is not limited to this.

Alternatively, in step S28 illustrated in FIG. 8, the attribute information analysis unit 202 can determine the priority order related to the drawing processing of the attribute in the second layer based on the number of times of references to the reusable object dependent on the attribute in the first layer for each attribute in the first layer, which is the lower layer to the layer of the attribute in the second layer.

If the information processing apparatus determines the priority order of the attribute in the second layer, in step S3 illustrated in FIG. 7, the page information analysis unit 203 selects the record in descending order of the determined priority order of a second attribute.

Figure 10A:
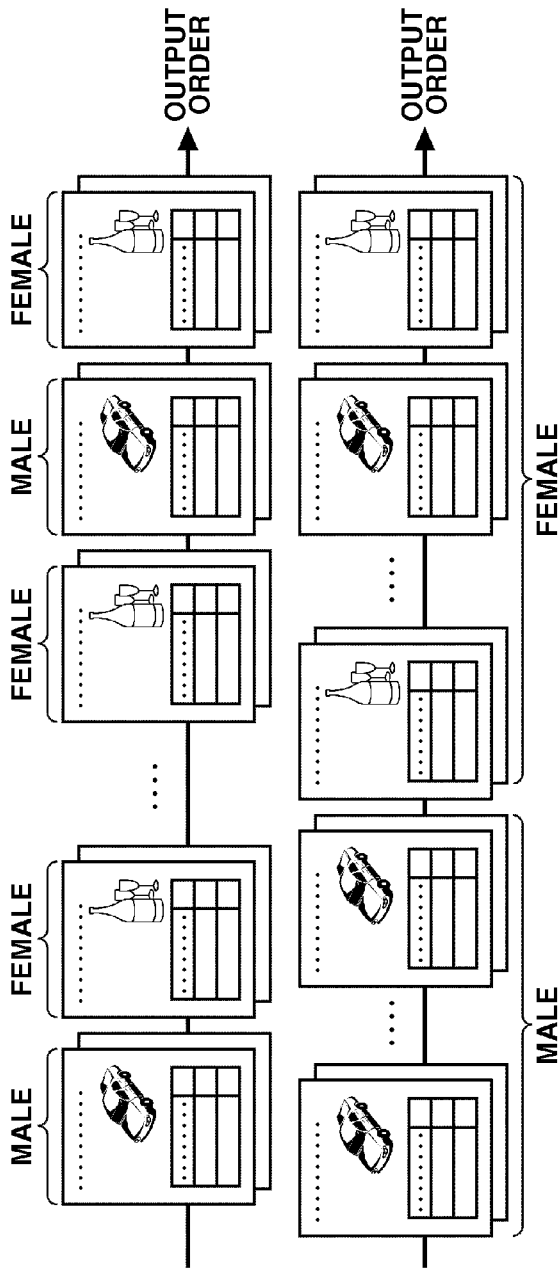
FIGS. 10A through 10C illustrate the effect of the first exemplary embodiment of the present invention.
Figure 10B:
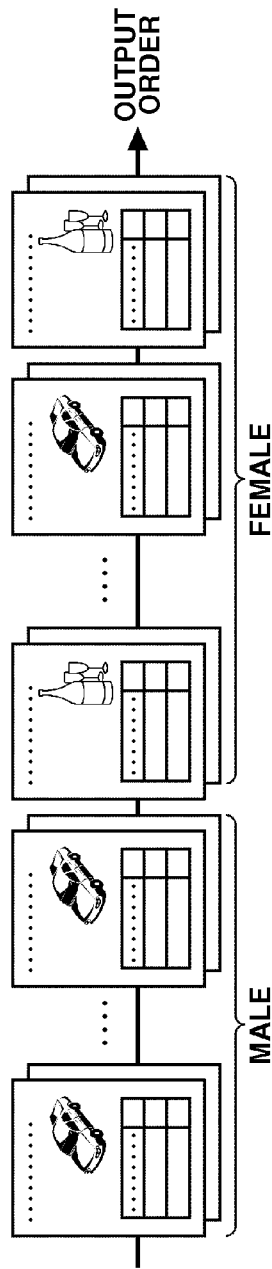
Figure 10C:
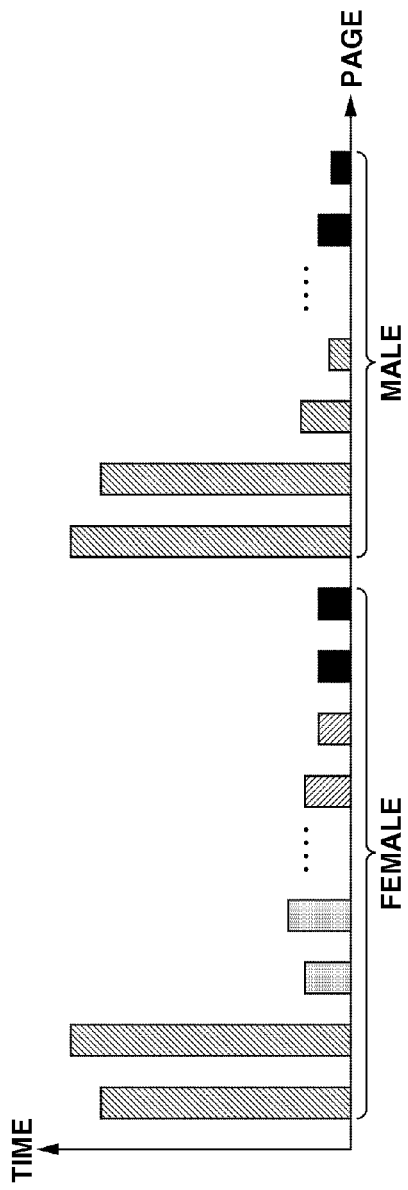

FIGS. 10A through 10C illustrate the effect of the present exemplary embodiment. More specifically, FIG. 10A illustrates an example of order of outputting the pages, which have been previously set to the PDL data. FIG. 10B illustrates an example of order of outputting the pages according to the present exemplary embodiment, which is described above with reference to FIGS. 7 through 9.

Referring to FIG. 10A, if the pages are output according to the order of outputting the pages previously set to the PDL data, pages having the attribute "male" and pages having the attribute "female" are output at random. Accordingly, in the table 703 illustrated in FIG. 9B, the objects ObjC and ObjB are randomly referred to. On the other hand, according to the present exemplary embodiment, as illustrated in FIG. 10B, a page having the attribute "male" is output after a page having the attribute "female" is output first with a higher priority. In the example illustrated in FIG. 9A, in the table 703, during drawing processing of the page, the ObjC is referred to with a bias after the object ObjB is referred to with a bias.

FIG. 10C illustrates an example of time required for drawing each page corresponding to the example illustrated in FIG. 10B. In the graph illustrated in FIG. 10C, a page is taken on the horizontal axis while time required for drawing a page is taken on the vertical axis. In the example illustrated in FIG. 10C, it is supposed that the drawing is executed starting from a page corresponding to the left portion of the graph.

Referring to FIG. 10C, for pages corresponding to each of the attributes "male" and "female", it takes a long time to execute drawing of first two pages (one record) but the rendering time is shortened for subsequent pages. This is because the load of the drawing of the subsequent pages is reduced for each of the attributes "male" and "female" for the following reason. For the attribute "female", the object ObjB is referred to with a bias by the subsequent pages while for the attribute "male", the object ObjC is referred to with a bias by the subsequent pages.

With the above-described configuration, the present exemplary embodiment can execute print and output processing more efficiently than print and output processing executed according to the page output order of previously set to the PDL data. In addition, according to the present exemplary embodiment having the above-described configuration, a plurality of pages can be output as one product in the unit of a predetermined attribute (i.e., in the unit of the attribute "female" or "male").

In the present exemplary embodiment, the number of times of references to the reusable object referred to with a bias by the page having the attribute "female", which is preferentially drawn, is higher than the number of times of references to the reusable object referred to with a bias by the page having the attribute "male". Accordingly, in the present exemplary embodiment having the above-described configuration, the effect of increasing the efficiency of executing drawing is higher than in the case where a page is drawn regardless of the number of times of references to the reusable object referred to biased toward the attribute.

With the above-described configuration, the information processing apparatus according to the present exemplary embodiment executes the drawing of pages in descending order of the number of times of references to the reusable object, which corresponds to the attribute included in the PDL data and having a high number of appearances and which is dependent on the object. Therefore, the information processing apparatus according to the present exemplary embodiment can increase the efficiency of the drawing processing while effectively preventing a phenomenon of cycledown.

Figure 11A:
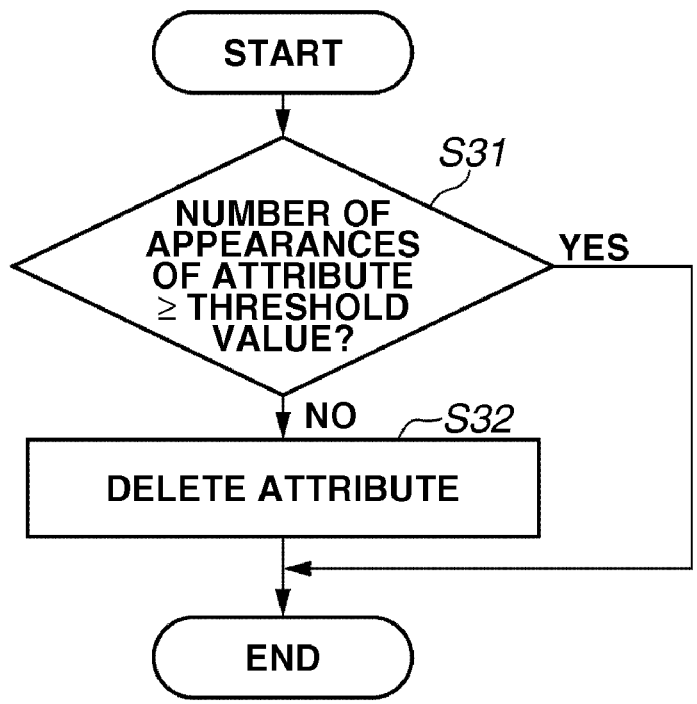
FIGS. 11A and 11B are flow charts illustrating an exemplary flow of processing executed by an information processing apparatus according to a second exemplary embodiment and a third exemplary embodiment of the present invention.

FIG. 11A is a flow chart illustrating an exemplary flow of processing executed by an information processing apparatus according to a second exemplary embodiment of the present invention. In the example illustrated in FIG. 11A, processing in steps S31 and S32 is executed during the processing in step S22 (FIG. 8) or after executing the processing in step S22 (FIG. 8). The processing according to the present exemplary embodiment except the processing in steps S31 and S32 illustrated in FIG. 11A is similar to that of the first exemplary embodiment described above.

Referring to FIG. 11A, in step S31, the attribute information analysis unit 202 determines whether the number of appearances of an attribute is equal to or higher than a predetermined threshold value. More specifically, the attribute information analysis unit 202 determines whether the number of appearances of the attribute having the highest number of appearances among the attributes in the related first layer of each second layer is equal to or higher than the predetermined threshold value.

If it is determined that the number of appearances of the attribute is equal to or higher than the predetermined threshold value (Yes in step S31), then the processing ends. In this case, the processing advances to step S23 illustrated in FIG. 8.

In the above-described manner, the attribute information analysis unit 202 selects the attribute in the second layer related to the attribute in the first layer, whose number of appearances have been determined to be equal to or higher than the predetermined threshold value in step S23 illustrated in FIG. 8.

On the other hand, if it is determined that the number of appearances of the attribute is less than the predetermined threshold value (No in step S31), then the processing advances to step S32. In step S32, the attribute information analysis unit 202 deletes the attribute. By executing the processing illustrated in FIG. 11A, the second attribute related to the deleted attribute is excluded from selection target in step S23 (FIG. 8).

According to the present exemplary embodiment having the above-described configuration, the attribute information analysis unit 202 can execute measurement of the number of times of references to the reusable object only of the pages corresponding to the attribute whose number of appearances is equal to or higher than the predetermined threshold value. As a result, the present exemplary embodiment can efficiently execute the processing for measuring the number of times of references to the reusable object.

Figure 11B:
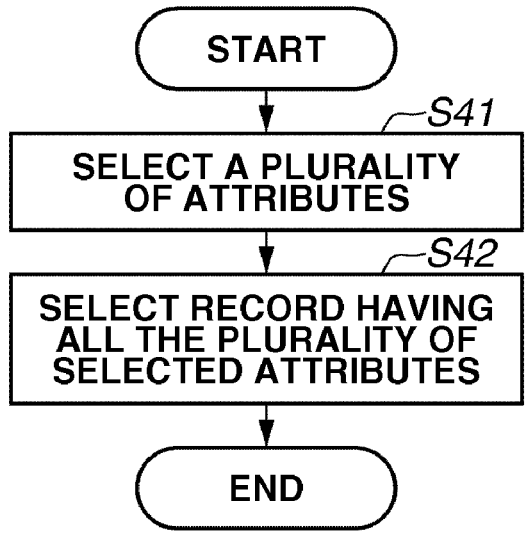

FIG. 11B is a flow chart illustrating an exemplary flow of processing executed by an information processing apparatus according to a third exemplary embodiment of the present invention. Processing in steps S41 and S42 of the flow illustrated in FIG. 11B corresponds to the processing in step S3 illustrated in FIG. 7. In the present exemplary embodiment, the processing except the processing in steps S41 and S42 illustrated in FIG. 11B is similar to that of the first exemplary embodiment.

Referring to FIG. 11B, in step S41, the page information analysis unit 203 selects a plurality of attributes. More specifically, the page information analysis unit 203 selects the attribute "female", which has the highest priority order of the attributes in the first layer illustrated in FIG. 9A, according to the priority order determined in step S2 (FIG. 7). In addition, the page information analysis unit 203 selects another attribute in the first layer, whose attribute in the related second layer is different from the attribute "sex", which is related to the attribute "female". In other words, the page information analysis unit 203 selects the attribute "shop C", whose number of appearances is the highest of all the attributes in the lower layer of the upper layer attribute "shop information".

Alternatively, the page information analysis unit 203 can select another attribute in the first layer according to an arbitrary selection criterion. Further alternatively, the page information analysis unit 203 can select a plurality of attributes of an arbitrary number. In step S42, the page information analysis unit 203 selects a record including all the plurality of attributes selected in step S41.

In the present exemplary embodiment having the above-described configuration, a display list is generated for a page corresponding to a record including both attributes "female" and "shop C". Accordingly, the present exemplary embodiment can effectively distribute points of appearances of the reusable objects which are to be subjected to the drawing for the first time.

Now, a fourth exemplary embodiment of the present invention will be described in detail below. In the present exemplary embodiment, the attribute information analysis unit 202 determines the priority order of attribute based on information that indicates a predetermined characteristic of the reusable object instead of determining the same based on the number of times of references to the reusable object.

The information indicating the predetermined characteristic of the reusable object is information at least including the data size of the reusable object. The complexity of the reusable object or an attribute of data (i.e., "text data, "image data", or "graphic data") can be used as the information indicating the predetermined characteristic of the reusable object.

After executing the processing in step S25 illustrated in FIG. 8, the attribute information analysis unit 202 calculates the data size of the reusable object to which the page refers for each attribute. In addition, the attribute information analysis unit 202 sets the priority order in descending order of the calculated data size. Alternatively, the attribute information analysis unit 202 can set the priority order in ascending order of the calculated data size.

With the above-described configuration, the present exemplary embodiment can determine the priority order of executing drawing based on the information that indicates the predetermined characteristic of the reusable object which the page refers to.

Figure 12:
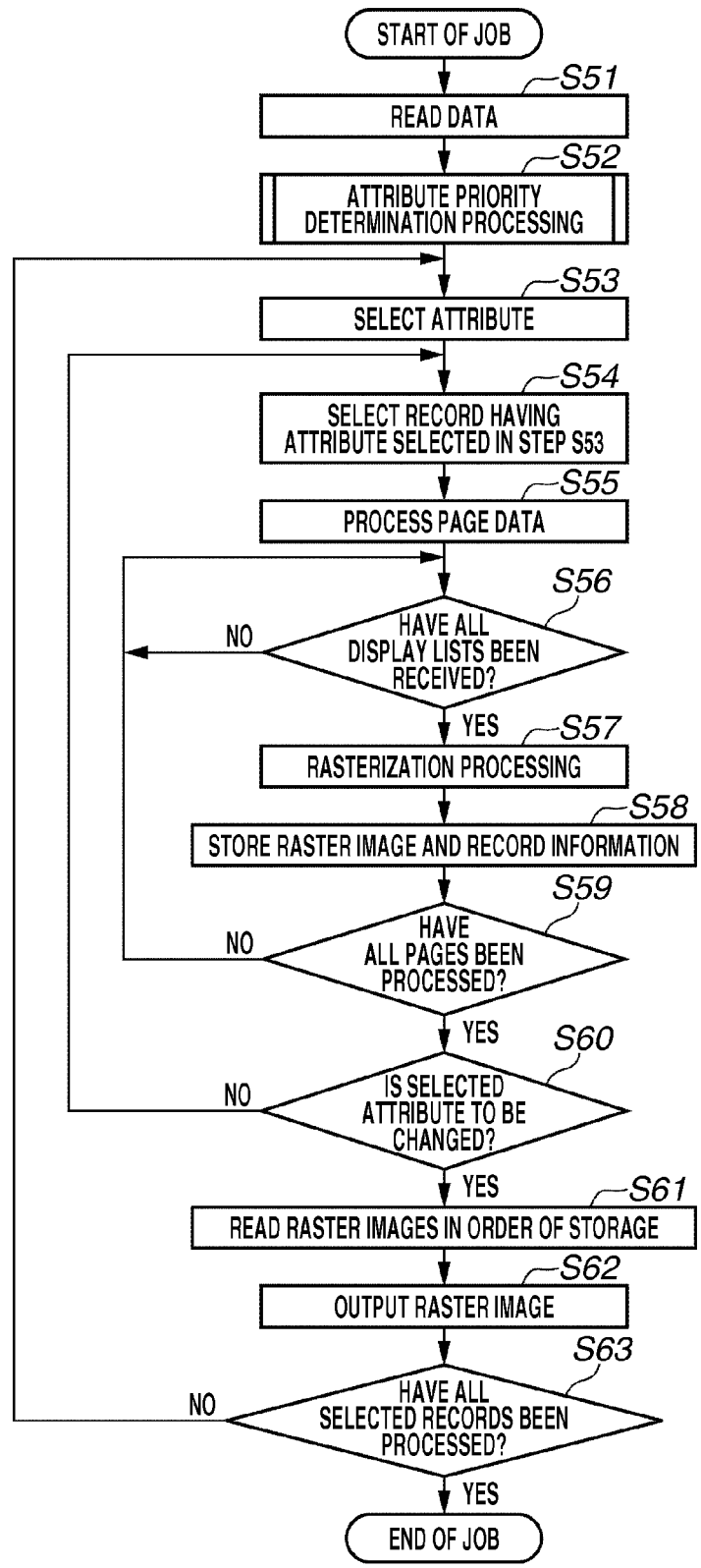
FIG. 12 is a flowchart illustrating an exemplary flow of processing executed by an information processing apparatus according to a fifth exemplary embodiment of the present invention.

FIG. 12 is a flow chart illustrating an exemplary flow of processing executed by an information processing apparatus according to a fifth exemplary embodiment of the present invention. Of processing in steps S51 through S63 illustrated in FIG. 12, the processing in steps S51 and S52 is similar to the processing in steps S1 and S2 illustrated in FIG. 7.

In addition, in the exemplary flow illustrated in FIG. 12, the processing in steps S53 and S54 is similar to the processing in step S3 (FIG. 7) or the processing in steps S41 and S42 (FIG. 11B). Furthermore, the processing on page data in step S55 illustrated in FIG. 12 is similar to the processing in steps S4 through S6 (FIG. 7) and steps S12 through S12 (FIG. 7). Moreover, the processing in steps S56 and S57 illustrated in FIG. 12 is similar to that in steps S7 and S8 illustrated in FIG. 7.

In the present exemplary embodiment, in step S57 illustrated in FIG. 12, the rendering processing unit 2 executes the rasterization and generates a raster image. Then, the rendering processing unit 2 stores the generated raster image and record information on the image data storage unit 21 (FIG. 1).

In step S59, the rendering processing unit 2 determines whether the raster image has been completely stored for all the pages included in the record selected in step S54. If it is determined that any page remains whose raster image has not been stored yet (No in step S59), then the processing returns to step S55. On the other hand, if it is determined that the raster image has been completely stored for all the pages included in the record selected in step S54 (Yes in step S59), then the processing advances to step S60.

In step S60, the rendering processing unit 2 determines whether the selected attribute is to be changed. If it is determined that the selected attribute is not to be changed (No in step S60), then the processing returns to step S54. On the other hand, if it is determined that the selected attribute is to be changed (Yes in step S60), then the processing advances to step S61.

In step S61, the rendering processing unit 2 serially reads the raster image corresponding to the record information stored in step S58 from the image data storage unit 21 in order of storage into the image data storage unit 21. In step S62, the rendering processing unit 2 transmits the raster image read in step S61 to the print engine unit 11. Then, the image is printed and output.

In step S63, the page information analysis unit 203 determines whether all the records selected in step S54 have been completely processed. If it is determined that any record that has not been processed yet remains (No in step S63), then the processing advances to step S53. On the other hand, if it is determined that all the records selected in step S54 have been completely processed (Yes in step S63), then the PDL analysis unit 1 ends the processing of the print job.

With the above-described configuration, the present exemplary embodiment can store the raster image for each record having the selected attribute and read and output the raster image every time the attribute is changed. As a result, the present exemplary embodiment can reduce the load of the processing for outputting the raster image. Accordingly, the present exemplary embodiment can prevent the phenomenon of cycledown.

Each exemplary embodiment of the present invention is as described above. However, the present invention is not limited to the above-described exemplary embodiments.

The present invention can also be achieved by providing a system or an apparatus with a storage medium storing program code of software which implements the functions of the embodiments and by reading and executing the program code stored in the storage medium with a computer of the system or the apparatus (a CPU or a micro processing unit (MPU)).

In this case, the program code itself, which is read from the storage medium, implements the functions of the embodiments described above, and accordingly, the storage medium storing the program code constitutes the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-296695 filed Dec. 28, 2009, which is hereby incorporated by reference herein in its entirety.

What is claimed is:

1. An information processing apparatus configured to process print data including an object laid out on a page, wherein the page data includes a variable object which varies page by page, a shared object which is referred to by a plurality of pages, and hierarchical attribute information about a page corresponding to the print data, the information processing apparatus comprising:

an attribute information analysis unit configured to analyze attribute information included in the print data, measure a number of appearances of an attribute in the print data, select an attribute in a predetermined layer based on the measured number of appearances of the attribute, and determine a priority order of the attribute based on a number of times of references to the shared object from a page corresponding to a record having the selected attribute;

an intermediate data generation unit configured to serially select an attribute based on the determined priority order and configured, for the page corresponding to the selected attribute, to generate intermediate data based on an object corresponding to the page; and an image data generation unit configured to generate image data by rasterizing the intermediate data generated by the intermediate data generation unit, wherein the intermediate data generation unit is configured to store intermediate data generated based on the shared object of the generated intermediate data in a predetermined storage unit, configured to extract the intermediate data from the storage unit for a page that refers to the shared object corresponding to the intermediate data that has been already stored in the storage unit, and configured to transfer the extracted intermediate data to the image data generation unit as intermediate data based on which the image data is to be generated.

2. The information processing apparatus according to claim 1,
wherein the attribute information analysis unit is configured to measure a number of appearances of an attribute in a first layer in the print data, configured to select an attribute in a second layer, which is related to the first layer and is an upper layer to the first layer, and configured to determine the priority order of the attribute in the first layer related to the attribute in the second layer based on the number of times of references to the shared object from a page corresponding to the attribute in the selected second layer, and
wherein the intermediate data generation unit is configured to select the attribute serially in the first layer based on the determined priority order and configured to generate intermediate data for the page corresponding to the selected attribute in the first layer.

3. The information processing apparatus according to claim 2, wherein the attribute information analysis unit is configured to measure the number of times of references to the shared object dependent on each attribute in the first layer for each page corresponding to each attribute in the first layer related to the attribute in the second layer and configured to determine the priority order of each attribute in the first layer based on a result of the measurement.

4. The information processing apparatus according to claim 2, wherein the intermediate data generation unit is configured to select the attribute in the first layer based on the determined priority order, configured to select another attribute in the first layer, whose attribute in a related second layer is different from the selected attribute in the first layer, and configured to generate intermediate data for a page corresponding to a record which includes all the selected attributes in the first layer.

5. The information processing apparatus according to claim 2, wherein the attribute information analysis unit is configured to determine whether the number of appearances of the attribute in the first layer is equal to or higher than a predetermined threshold value and configured to select the attribute in the second layer related to the attribute in the first layer whose number of appearances has been determined to be equal to or higher than the predetermined threshold value.

6. The information processing apparatus according to claim 1, wherein the attribute information analysis unit is configured to determine the priority order of attribute based on information that indicates a predetermined characteristic of the shared object instead of the number of times of references of the shared object.

7. The information processing apparatus according to claim 6, wherein the information indicating the predetermined characteristic of the shared object at least includes a data size of the shared object.

8. The information processing apparatus according to claim 1, wherein the image data generation unit is configured to store the image data generated for the page corresponding to the selected attribute in a predetermined storage unit and configured, if the attribute to be selected has been changed, to read and output the image data from the storage unit.

9. A method for controlling an information processing apparatus configured to process print data including an object laid out on a page, wherein the page data includes a variable object, which varies page by page, a shared object, which is referred to by a plurality of pages, and hierarchical attribute information about a page corresponding to the print data, the method comprising:
analyzing attribute information included in the print data;
measuring a number of appearances of an attribute in the print data;
selecting an attribute in a predetermined layer based on the measured number of appearances of the attribute;
determining a priority order of the attribute based on a number of times of references to the shared object from a page corresponding to a record having the selected attribute;
serially selecting an attribute based on the determined priority order;
generating intermediate data, for the page corresponding to the selected attribute, based on an object corresponding to the page;
generating image data by rasterizing the generated intermediate data;
storing intermediate data generated based on the shared object, of the generated intermediate data, in a predetermined storage unit;
extracting the intermediate data from the storage unit for a page that refers to the shared object corresponding to the intermediate data that has been already stored in the storage unit; and
setting the extracted intermediate data as intermediate data.

10. A computer-readable storage medium storing instructions which, when executed by a computer, cause the computer to perform the operations included in the method according to claim 9 for controlling the information processing apparatus.

* * * * *